UNITED STATES PATENT OFFICE.

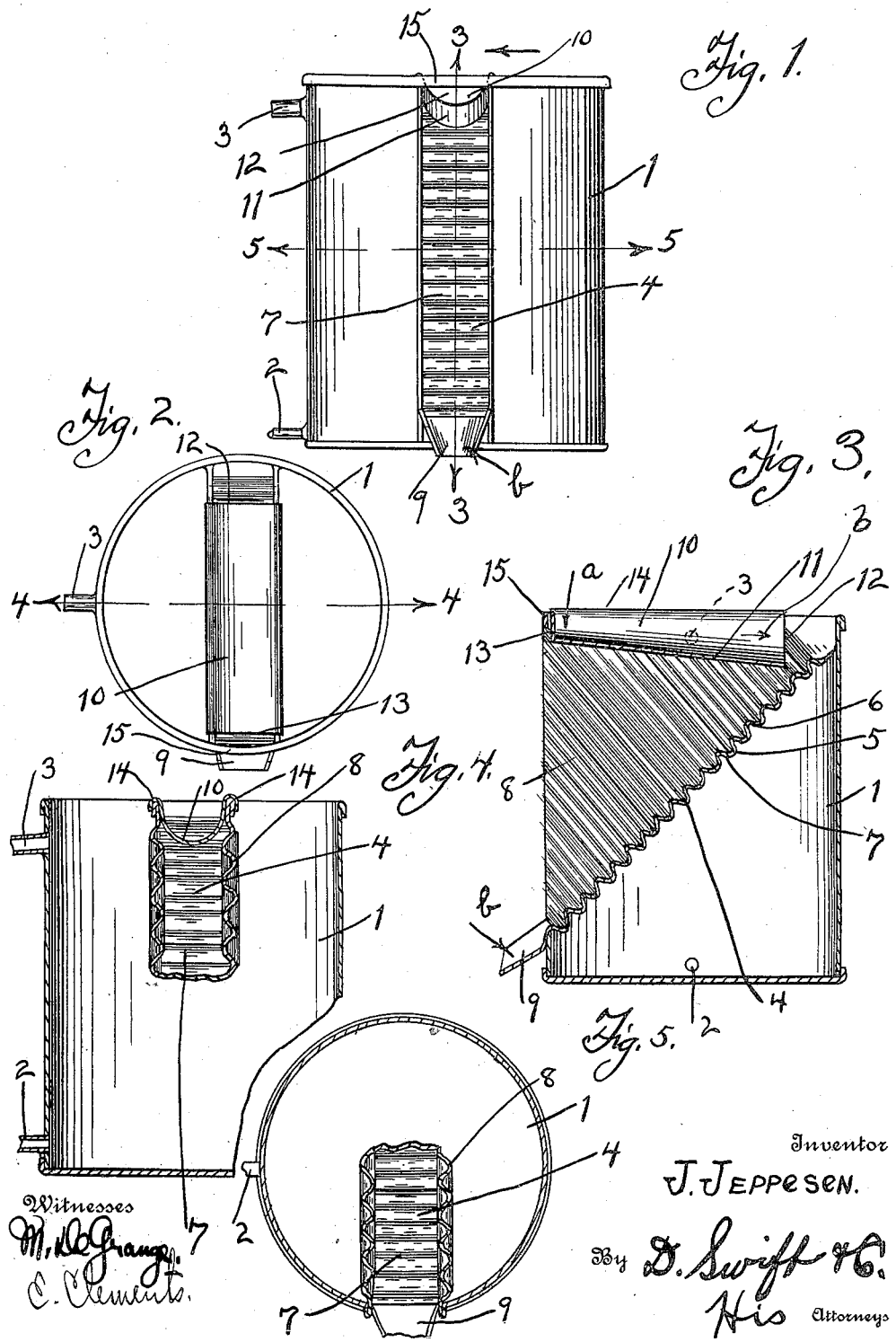

JOHN JEPPESEN, OF CENTERBURG, OHIO.

MILK COOLER AND AERATOR.

1,092,532.

Specification of Letters Patent.

Patented Apr. 7, 1914.

Application filed June 18, 1913. Serial No. 774,414.

*To all whom it may concern:*

Be it known that I, JOHN JEPPESEN, a citizen of the United States, residing at Centerburg, in the county of Knox and State of Ohio, have invented a new and useful Milk Cooler and Aerator; and I do hereby declare the following to be a full, clear, and exact description of the invention, such as will enable others skilled in the art to which it appertains to make and use the same.

This invention relates to a new and useful milk cooler and aerator.

An object of the invention is to provide a milk or cream cooler adapted for use in connection with cream separators, in order to cool and keep the milk or cream cold as it passes from the cream separator into the receptacle. In other words, the cooler is arranged between the separator and a receptacle.

One of the features of the invention is the provision of a cylindrical receptacle provided with a transverse trough having a corrugated or stepped inclined bottom, thereby constituting riffles, over which the milk or cream slowly flows very shallow, thereby rendering it easier to be kept cool by the cold water in the cylindrical receptacle, which cold water partially surrounds the trough-shaped channel, and is being constantly replenished. The sides of the trough-shaped channel are likewise corrugated, so as to permit of a freer circulation of the water in the cylindrical receptacle or cooler and about the trough-shaped channel.

Another feature of the invention is the provision of the loosely suspended conveyer, the bottom of which is inclined slightly, and is provided with overhanging lips to overlie the upper edges of the sides of the trough shaped channel. The milk or cream is adapted to leave the separator, and enter the conveyer at the point indicated by the arrow *a*, slowly passing down the conveyer, and then upon the riffles of the inclined bottom of the trough-shaped channel. The cream or milk passes down the riffles in such a shallow quantity, that the same is easily kept cool by the cold water in the cylindrical receptacle or cooler. The milk or cream leaves the riffles at the spout, indicated by the arrow *b*, from which spout the same enters a receptacle (not shown).

In practical fields the details of construction may necessitate alterations, to which the applicant is entitled, provided the alterations fall within the scope of what is claimed.

The invention comprises further features and combination of parts, as hereinafter set forth, shown in the drawings and claimed.

In the drawings:—Figure 1 is a view in elevation of the improved cooler. Fig. 2 is a plan view. Fig. 3 is a sectional view on line 3—3 of Fig. 1. Fig. 4 is a sectional view on line 4—4 of Fig. 2. Fig. 5 is a sectional view on line 5—5 of Fig. 1.

Referring more particularly to the drawings, 1 designates a cylindrical receptacle, which is adapted to contain a cooling fluid, such as water. This cooling water is designed to enter the receptacle 1 through the pipe 2, and is constantly flowing. As the water in the receptacle 1 rises, it constantly passes out by way of the pipe 3. In this manner the water in the receptacle is being constantly replenished.

Extending transversely and arranged vertically of the receptacle 1 is a trough-shaped channel 4, the bottom 5 of which is inclined and provided with corrugations 6 constituting riffles 7. The sides of the trough-shaped channel are formed with corrugations 8 corresponding to the riffles or corrugations 6, whereby the water in the receptacle may more freely circulate. At the lower end of the inclined bottom, or beyond the corrugations or riffles, the trough-shaped channel terminates in an outlet spout 9.

A trough-shaped conveyer 10 is provided, the bottom 11 of which is slightly inclined, as shown clearly in Fig. 3. The end 12 of the trough-shaped conveyer is opened, while the end 13 is closed, as shown. The longitudinal upper edges of the conveyer are constructed with overturned portions or flanges 14, which overlie the upper edges of the corrugated sides 8 of the trough-shaped channel, thereby constituting means for loosely suspending the conveyer, whereby the same may be easily removed or replaced.

At the forward portions of the corrugated sides 8 at the upper end or portion of the receptacle 1, where the sides 8 merge into the receptacle 1, a connecting bar 15 is provided.

This improved cooler, in practice, is designed to be constructed of any suitable sheet metal, such as tin or galvanized sheet iron, and all the various joints are designed to be rendered secure, by means of soldering or otherwise.

This improved cooler or aerator is adapted to be arranged between a separator and a receptacle (not shown). The milk or cream is adapted to leave the separator and enter the conveyer at the point indicated by the arrow $a$, the cream or milk slowly passing down the inclined bottom of the conveyer, from whence it slowly trickles or riffles down the corrugations 6 of the inclined bottom of the trough-shaped channel, until it passes into a receptacle (not shown) adapted to be placed under the spout 9. As the milk or cream riffles down the corrugations or riffles 6, the same is kept cool by the constantly replenished cold water in the receptacle 1.

The trough-shaped conveyer 10 may be adjusted toward the corrugated or riffled inclined bottom of the trough-shaped channel, as indicated by the arrow $b$, in order to cut off the supply to the riffles.

The invention having been set forth, what is claimed as new and useful is—

1. A milk cooler comprising a cylindrical casing adapted to contain the cooling fluid, a trough-shaped channel arranged vertically and transversely of the casing having an inclined riffled bottom terminating at its lower end in a spout, the sides of the trough-shaped channel having corresponding riffles or corrugations, a trough-shaped conveyer having a gradually inclined bottom and extending and arranged within the channel between the sides thereof, the upper longitudinal edges of the conveyer terminating in overhanging flanges to overlie and engage the upper edges of the sides of the trough-shaped channel thereby constituting means to loosely and replaceably suspend the conveyer in position.

2. A milk cooler comprising a cylindrical receptacle provided with a compartment for the containment of constantly replenished cooling fluid, a trough-shaped channel arranged vertically and extending transversely of the receptacle provided with an inclined bottom corrugated to form riffles, and a trough-shaped conveyer having an inclined bottom suspended from the upper edges of the sides of said channel and extending thereinto, the trough-shaped conveyer adapted to be adjusted toward the riffles to cut off the supply from the conveyer to the riffles.

3. A milk cooler comprising a cylindrical casing adapted to contain cooling fluid, a trough-shaped channel arranged vertically and transversely of the casing having an inclined riffled bottom extending from the top of the casing at one side to the bottom of the casing at the opposite side terminating at the bottom of the casing in a spout, the walls of the riffles being disposed at slight acute angles to one another, the sides of the trough-shaped channel having corresponding riffles, said riffles acting to cause a gradual flow of the milk, a trough-shaped conveyer having a gradually inclined bottom arranged within the channel between the sides thereof and being of a length shorter than the space between the upper portion of the riffled bottom and the opposite side of the casing, said conveyer being closed at one end and opened at the other and having its upper longitudinal edges terminating in overhanging flanges to overlie and engage the upper edges of the sides of the trough-shaped channel thereby constituting means to loosely and replaceably suspend the conveyer in position, said conveyer adapted to be adjusted toward the upper portion of the riffled bottom of the channel to regulate the milk in its flow upon the riffled bottom.

In testimony whereof I have signed my name to this specification in the presence of two subscribing witnesses.

JOHN JEPPESEN.

Witnesses:
S. ROBERT BEST,
CHAS. D. HAYDEN.

---

Copies of this patent may be obtained for five cents each, by addressing the "Commissioner of Patents, Washington, D. C."